United States Patent
Wong et al.

(10) Patent No.: US 11,790,008 B2
(45) Date of Patent: Oct. 17, 2023

(54) PERSISTED QUERIES AND BATCH STREAMING

(71) Applicant: BUSINESS OBJECTS SOFTWARE LTD., Dublin (IE)

(72) Inventors: Justin Wong, Burnaby (CA); JianHong Tan, Vancouver (CA); Kyoung Woo Nam, Burnaby (CA); Patrick Wang, Richmond (CA); Ruoxin Zhou, Vancouver (CA); Veljko Jovanovic, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 617 days.

(21) Appl. No.: 16/569,040

(22) Filed: Sep. 12, 2019

(65) Prior Publication Data

US 2021/0081451 A1  Mar. 18, 2021

(51) Int. Cl.
*G06F 16/00* (2019.01)
*G06F 16/904* (2019.01)
*G06F 16/903* (2019.01)
*G06F 16/9038* (2019.01)
*G06F 16/908* (2019.01)

(52) U.S. Cl.
CPC ......... *G06F 16/904* (2019.01); *G06F 16/908* (2019.01); *G06F 16/9038* (2019.01); *G06F 16/90335* (2019.01)

(58) Field of Classification Search
CPC ............................ G06F 16/904; G06F 16/908
USPC ........................................................ 707/722
See application file for complete search history.

(56) References Cited

U.S. PATENT DOCUMENTS

| | | | | |
|---|---|---|---|---|
| 7,680,810 | B2* | 3/2010 | Marcjan | G06F 16/957 709/228 |
| 7,752,165 | B2* | 7/2010 | Ireland | G06F 16/27 707/609 |
| 7,966,311 | B2* | 6/2011 | Haase | G06F 16/2471 707/713 |
| 9,007,302 | B1* | 4/2015 | Bandt-Horn | G06F 3/044 345/156 |
| 10,311,054 | B2* | 6/2019 | Nguyen | G06F 16/2471 |
| 10,365,995 | B2* | 7/2019 | Shani | G06F 11/3688 |
| 10,397,185 | B1* | 8/2019 | Sandholm | H04L 63/102 |
| 10,719,517 | B1* | 7/2020 | Li | G06F 16/258 |
| 10,803,065 | B1* | 10/2020 | Wong | G06F 16/285 |
| 10,810,226 | B2* | 10/2020 | Xue | G06F 16/26 |
| 11,003,713 | B1* | 5/2021 | Nagaraja | G06F 16/901 |

(Continued)

*Primary Examiner* — Mariela Reyes
*Assistant Examiner* — Rezwanul Mahmood
(74) *Attorney, Agent, or Firm* — Buckley, Maschoff & Talwalkar LLC

(57) ABSTRACT

A system includes reception of a user request for a set of data visualizations, execution, in response to the user request, of a main thread to request metadata associated with the set of data visualizations from a remote system, execution of a worker thread to request a set of persisted queries associated with the set of data visualizations from the remote system, to issue the set of persisted queries to the remote system, to receive query results associated with the set of persisted queries from the remote system, and to initiate storage of the query results in a local memory, and execution of the main thread to retrieve the query results stored in the local memory and render the set of data visualizations based on the retrieved query results.

17 Claims, 8 Drawing Sheets

(56) References Cited

U.S. PATENT DOCUMENTS

| | | | |
|---|---|---|---|
| 11,409,756 B1* | 8/2022 | Park | G06F 16/254 |
| 2004/0243663 A1* | 12/2004 | Johanson | G06F 9/542 |
| | | | 709/200 |
| 2007/0180408 A1* | 8/2007 | Rusu | G06F 16/957 |
| | | | 707/E17.119 |
| 2008/0027788 A1* | 1/2008 | Lawrence | G06Q 30/02 |
| | | | 705/7.33 |
| 2008/0301086 A1* | 12/2008 | Gupta | G06F 16/283 |
| 2009/0319996 A1* | 12/2009 | Shafi | G06F 8/314 |
| | | | 717/125 |
| 2010/0036804 A1* | 2/2010 | Blamer | G06F 16/24552 |
| | | | 707/E17.014 |
| 2010/0036805 A1* | 2/2010 | Blamer | G06F 16/24539 |
| | | | 707/E17.014 |
| 2010/0082656 A1* | 4/2010 | Jing | G06F 16/24552 |
| | | | 707/E17.014 |
| 2010/0145979 A1* | 6/2010 | Barnett | G06F 16/29 |
| | | | 707/769 |
| 2010/0185984 A1* | 7/2010 | Wright | G06F 16/29 |
| | | | 715/833 |
| 2011/0145286 A1* | 6/2011 | LaRowe | G06F 16/951 |
| | | | 715/705 |
| 2011/0228668 A1* | 9/2011 | Pillai | G06F 11/2023 |
| | | | 370/217 |
| 2011/0276562 A1* | 11/2011 | Madden-Woods | |
| | | | G06F 16/9038 |
| | | | 707/E17.014 |
| 2012/0278313 A1* | 11/2012 | Gonzalez | G06F 16/248 |
| | | | 707/E17.082 |
| 2014/0046638 A1* | 2/2014 | Peloski | G06F 16/2246 |
| | | | 703/6 |
| 2014/0244619 A1* | 8/2014 | Doroshenko | G06F 16/3331 |
| | | | 707/769 |
| 2014/0310232 A1* | 10/2014 | Plattner | G06F 16/24539 |
| | | | 707/602 |
| 2014/0358982 A1* | 12/2014 | Pareek | H04L 67/10 |
| | | | 709/201 |
| 2015/0161224 A1* | 6/2015 | LaRowe | G06F 16/90335 |
| | | | 707/776 |
| 2015/0263995 A1* | 9/2015 | Mahood | H04L 51/04 |
| | | | 715/753 |
| 2015/0347508 A1* | 12/2015 | Lang | G06F 16/2462 |
| | | | 707/718 |
| 2016/0004820 A1* | 1/2016 | Moore | G16H 15/00 |
| | | | 705/3 |
| 2016/0334944 A1* | 11/2016 | Teodorescu | G06F 16/24537 |
| 2017/0017672 A1* | 1/2017 | Fan | G06F 16/9574 |
| 2017/0031976 A1* | 2/2017 | Chavan | G06F 16/2393 |
| 2017/0193116 A1* | 7/2017 | Wong | G06F 16/248 |
| 2017/0235848 A1* | 8/2017 | Van Dusen | G06F 16/904 |
| | | | 705/12 |
| 2018/0218046 A1* | 8/2018 | Woo | G06F 16/248 |
| 2018/0336214 A1* | 11/2018 | Kumar | G06F 16/26 |
| 2019/0065500 A1* | 2/2019 | Martin | G06F 16/24552 |
| 2019/0205743 A1* | 7/2019 | Jiang | G06F 16/313 |
| 2019/0243865 A1* | 8/2019 | Rausch | G06F 16/907 |
| 2019/0258677 A1* | 8/2019 | Beedgen | G06F 16/90335 |
| 2019/0279281 A1* | 9/2019 | Kumar | G06Q 30/0631 |
| 2019/0311301 A1* | 10/2019 | Pyati | G06F 16/901 |
| 2019/0370392 A1* | 12/2019 | Cazin | G06F 16/334 |
| 2020/0117757 A1* | 4/2020 | Yanamandra | H04L 41/5064 |
| 2020/0145310 A1* | 5/2020 | Lodhia | H04L 67/568 |
| 2020/0192899 A1* | 6/2020 | Joshi | G06F 16/24552 |
| 2020/0192936 A1* | 6/2020 | Narula | G06F 9/45529 |
| 2020/0250095 A1* | 8/2020 | Chen | G06F 12/0815 |
| 2020/0394455 A1* | 12/2020 | Lee | G06Q 40/08 |
| 2021/0019338 A1* | 1/2021 | Grampurohit | G06F 3/0481 |
| 2021/0081451 A1* | 3/2021 | Wong | G06F 16/958 |
| 2021/0089538 A1* | 3/2021 | Rooney | G06F 16/2282 |
| 2021/0209118 A1* | 7/2021 | Reuther | G06F 16/242 |
| 2021/0216552 A1* | 7/2021 | Gale | G06F 16/254 |
| 2021/0216553 A1* | 7/2021 | Gale | G06F 16/283 |
| 2023/0185776 A1* | 6/2023 | Livathinos | G06F 16/211 |
| | | | 707/791 |

* cited by examiner

PERSISTED QUERIES AND BATCH STREAMING

BACKGROUND

Enterprise software systems receive, generate, and store data related to many aspects of an enterprise. Users operate reporting tools to access such data and display the data in useful formats, such as in graphic visualizations. Conventionally, a user may operate a reporting tool to request a set of one or more visualizations (e.g., a dashboard). In response, the reporting tool fetches a definition of the dashboard and of the visualizations contained therein from a remote system. The reporting tool builds queries based on the definitions to retrieve data for populating the visualizations, issues the queries to the remote system, receives query results, and renders the visualizations based on the definitions and the query results.

The reporting tool cannot render a visualization until the query results for the visualization are received from the remote system. As a result, the reporting tool may idle while waiting for the query results, resulting in frustration for the user. Since the entire dashboard is not fully rendered until the query results for each visualization are received from the remote system, the overall time required and resulting frustration increase as the number of visualizations in the dashboard increase. Moreover, current browsers, in which most reporting tools run, limit parallelization of the process by permitting at most six simultaneously-outstanding queries. Systems to improve rendering performance are desired.

DETAILED DESCRIPTION

The following description is provided to enable any person in the art to make and use the described embodiments. Various modifications, however, will remain readily apparent to those in the art.

Generally, some embodiments provide a system to persist queries for each visualization of a set of one or more visualizations, and to issue the queries and receive results thereof in parallel with initializing and rendering the set of visualizations. Consequently, the visualizations may be rendered and presented to a requesting user more quickly than in existing systems.

Figure 1:
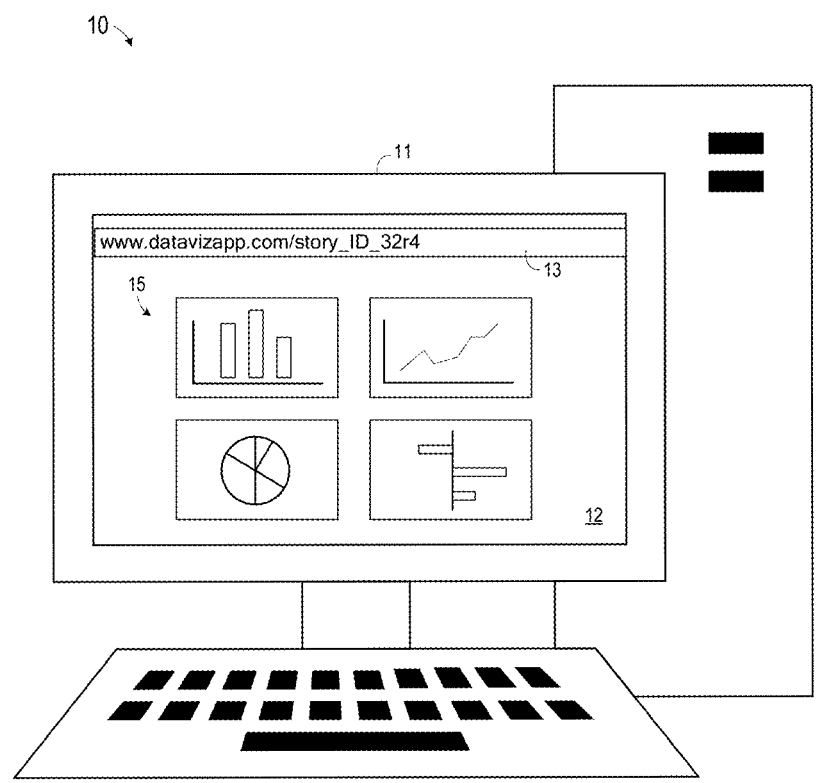
FIG. 1 is a view of a user interface presenting several data visualizations according to some embodiments.

FIG. 1 illustrates system 10 according to some embodiments. System 10 may comprise any client computing system executing a client application. System 10 is not limited to a desktop computer, and may comprise a smartphone, a laptop computer, a tablet computer, etc.

According to some embodiments, system 10 executes a Web browser to present user interface 12 to a user on display 11. The user enters a URL associated with a set of visualizations into address bar 13 (e.g., by directly typing, copy-and-pasting, or selecting a provided link), and system 10 forwards a corresponding request to over the Web. The request is received by a corresponding Web server and a sequence of responses and requests ensues which results in presentation of data visualizations 15 on display 11.

Each of visualizations 15 may comprise an interactive entity which will be referred to herein as a "widget". A widget may present information about any defined data values in the form of an interactive visualization. A widget may be defined by metadata specifying a data source, a visualization type, and dimensions, measures and/or filters of a data model, or schema, which characterizes the data stored in the data source. A set of multiple widgets will be referred to as a "story", which may together provide insight into a particular scenario.

As mentioned above, and according to some embodiments, queries associated with the widgets of a story may be persisted and used to retrieve widget data in parallel with the initialization of the story and widget containers of interface 12.

Figure 2:
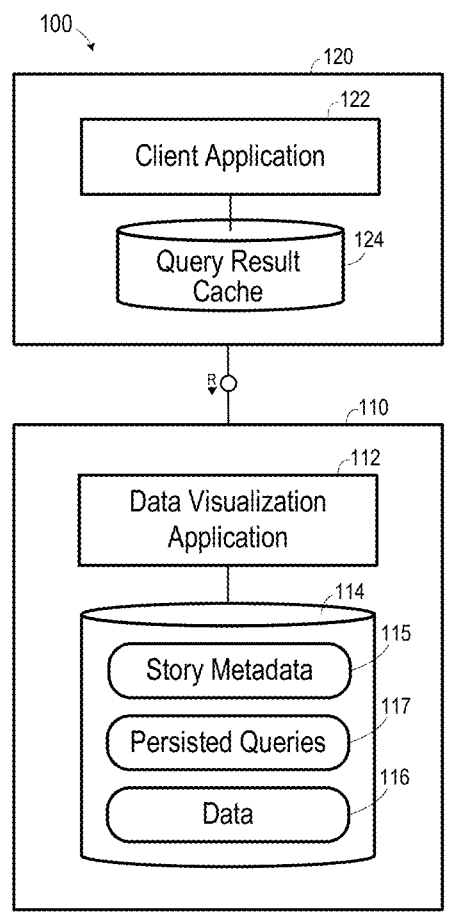
FIG. 2 is a block diagram of a system to provide data visualizations according to some embodiments.

FIG. 2 is a block diagram of client-server architecture 100 supporting persisted queries according to some embodiments. Embodiments are not limited to the FIG. 2 system. Architecture 100 includes data server 110 and client device 120. Generally, data visualization application 112 receives requests from client application 122 and provides results to client application 122 based on those requests. Data server 110 may simultaneously serve many client devices according to some embodiments.

In one specific example, client application 122 is executed to present a user interface to a user. The user manipulates the user interface to request a story. In response, client application 122 transmits a request to data visualization application 112 for metadata associated with the story and stored in story metadata 115 of data store 114. Contemporaneously, client application 122 (e.g., on a separate execution thread) requests persisted queries associated with the widgets of the story and stored among persisted queries 117.

Client application 122 initializes the story container and the widget containers while also (again on a separate thread) issuing the persisted queries to data visualization application 112 and receiving query results based on data 116 therefrom. Received query results are stored in query result cache 124 of client system 120. Once any widget container is initialized, client application 122 looks into query result cache 124 to determine whether query results associated with that widget have been received and, if so, proceeds to render the widget using the received query results.

Data 116 of data store 114 includes table metadata, dimension members, and measure values. Generally, the table metadata defines one or more data models, each of which includes data objects such as dimension and measures. The stored dimension members and measure values comprise data representing actual (i.e., instantiated) versions of those objects. The table metadata also associates each measure and dimension with one or more physical entities (e.g., a physical database table, associated columns of one or more database tables).

Data 116 of data store 114 may comprise one or more of conventional tabular data, row-based data, column-based data, and object-based data. Moreover, the data may be indexed and/or selectively replicated in an index to allow fast searching and retrieval thereof. Data store 114 may support multi-tenancy to separately support multiple unrelated clients by providing multiple logical database systems which are programmatically isolated from one another.

Data store 114 may comprise any query-responsive data source or sources that are or become known, including but not limited to a structured-query language (SQL) relational database management system. Data store 114 may comprise a relational database, a multi-dimensional database, an eXtendable Markup Language (XML) document, or any other data storage system storing structured and/or unstructured data. The data of data store 114 may be distributed among several relational databases, dimensional databases, and/or other data sources. Embodiments are not limited to any number or types of data sources.

Data store 114 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data visualization application 112 may be separated from or closely integrated with data store 114. Data visualization application 112 may be executed completely on a database platform of data store 114, without the need for an additional server. Architecture 100 may be implemented using any client-server architecture that is or becomes known, including but not limited to on-premise, cloud-based and hybrid architectures.

Client application 122 may comprise program code of an application for presenting user interfaces to allow interaction with server 110 and to render widgets. According to some embodiments, client application 122 is a Web application provided by data visualization application 112 and executing within an execution engine of a Web browser. Data visualization application 112 may also provide information and data associated with stories and widgets in a format (e.g., JavaScript Object Notation (JSON)) which may be rendered by such a Web application.

Figure 3:
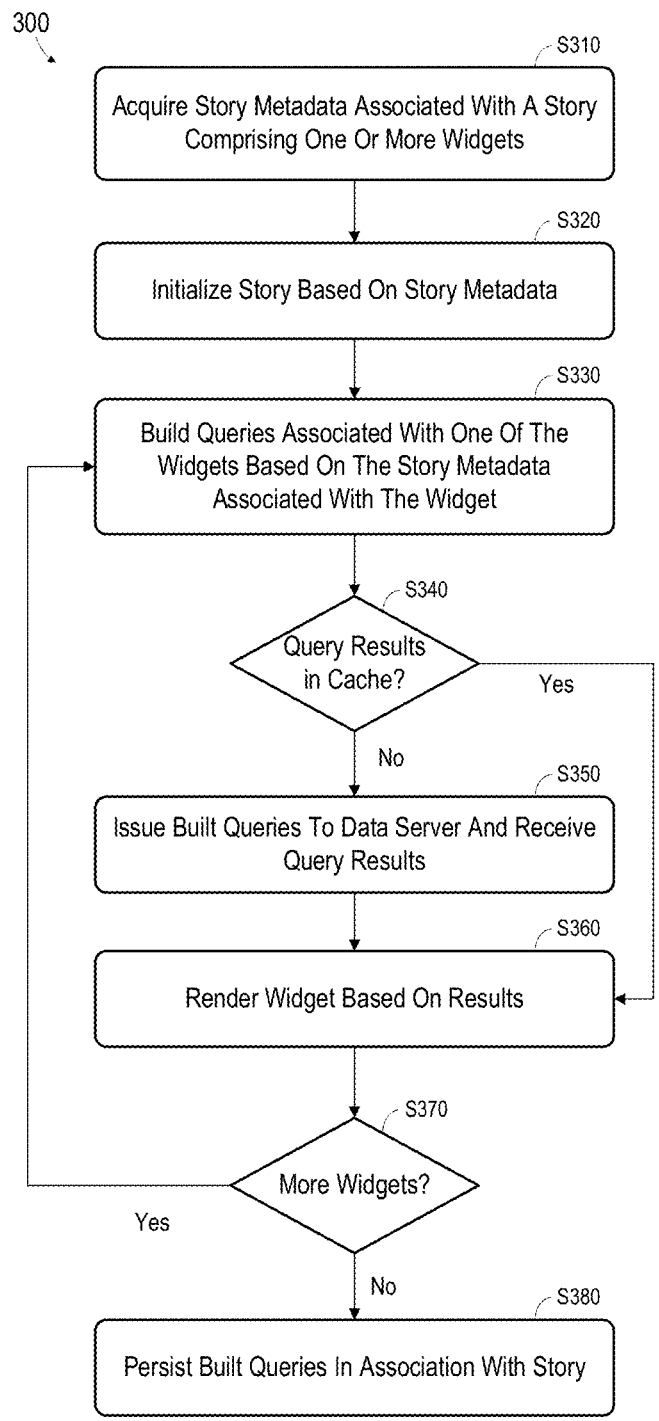
FIG. 3 is a flow diagram of a main thread process to provide data visualizations according to some embodiments.
Figure 4:
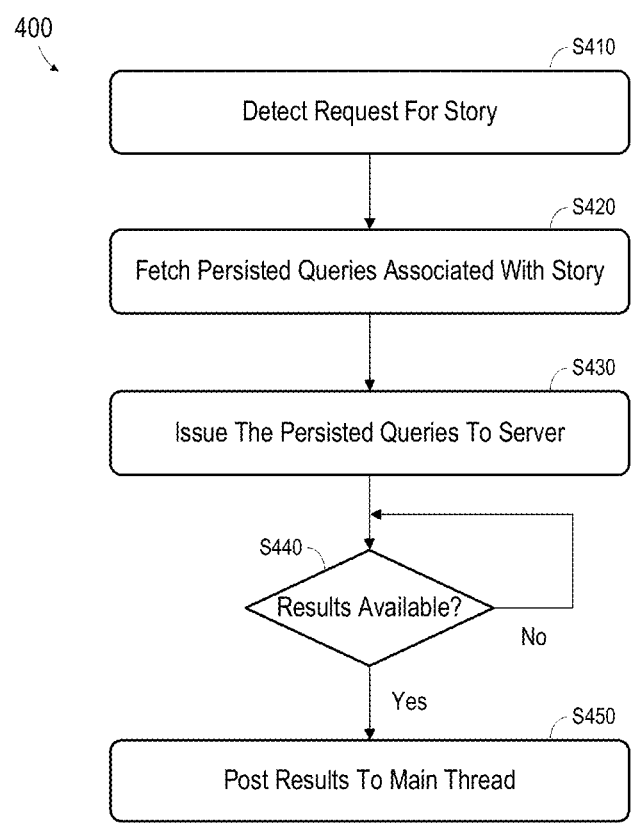
FIG. 4 is a flow diagram of a worker thread process to provide data visualizations according to some embodiments.

FIG. 3 comprises a flow diagram of process 300 to render a story including several widgets according to some embodiments. Process 300 is executed by a main thread in some embodiments, while process 400 of FIG. 4 is executed by a worker thread. This distributed execution provides parallel processing which may result in more efficient story rendering than is known in the art.

In some embodiments, various hardware elements of system 10 or device 120 execute program code to perform process 300. Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, story metadata associated with a story is acquired at S310. The story metadata defines one or more widgets, or data visualizations, of the story. A story may be considered a container including widgets, toolbars, and other user interface elements.

S310 may be initiated in response to a user instruction to access a story. As mentioned above, the user instruction may be the entry of a URL associated with a story into a Web browser address bar. According to some embodiments, the Web browser accesses the URL (e.g., corresponding to data visualization application 112) and receives source code of a client Web application in response. The client Web application includes code which is executable to render story and widget containers. The Web application source code is executed at S310 to request and acquire the story metadata.

The story is initialized at S320 based on the story metadata. Initialization at S320 may comprise execution of the main thread to build up the story container, initialize toolbars, etc., in accordance with the acquired story metadata. A widget of the story is then initialized at S330 to build the widget, read a definition of the widget (e.g., type, dimensions, axes) from the story metadata, and to build the queries needed to populate the widget based on the widget definition and any story filters.

The main thread then fires the built queries to a local cache at S340 to determine whether corresponding query results are stored therein. As will be described below, a worker thread executes in parallel with the main thread to retrieve query results based on persisted queries associated with the story and to post the retrieved query results to the local cache. For purposes of the present example, it will be assumed that the story is currently not associated with any persisted queries, and therefore the worker thread has not retrieved query results and the local cache is empty. Accordingly, the determination at S340 is negative.

Flow therefore continues to S350 to fire the built queries to the backend server and wait to retrieve the corresponding query results. According to some embodiments, the built queries are passed to the worker thread for firing the built queries to the server. The worker thread then posts the received query results to the main thread, in order to store the query results in the local cache. The local cache may store the query results as values associated with a corresponding key which represents (e.g., is a hashed value) of the built queries. The main thread then retrieves the query results from the local cache at S350 using the corresponding key.

The widget is rendered based on the query results at S360. It is then determined at S370 whether the story includes more widgets. If so, flow returns to S330 to initialize another widget as described above. Flow therefore cycles through S330-S370 until all widgets of the story are rendered. Next, at S380, all the queries which were built in order to render the story widgets are persisted. For example, the main thread may issue a request to persist the built queries in association with an identifier of the story among persisted queries 117 of data store 114.

According to some embodiments, the built queries to be persisted at S380 are tracked based on cache misses which occur at S340. For example, a query for a widget is built at S330 and the query is used to search the local cache at S340. If the local cache does not include results corresponding to the query, the query is recorded and flow proceeds to S350.

Some embodiments allow more than one query (e.g., six queries) to the server to be pending at once. For example, after issuing a query to the server at S350, flow may return to S330 to initialize another widget and issue a corresponding query to the server at S350. The local cache is then periodically checked for the corresponding query results and each widget is rendered at S360 once its respective results have been received.

Some modern browser applications allow web applications to invoke two parallel execution threads, a main thread and a worker thread. Certain functions such as rendering may be limited to performance by one of the threads (e.g., the main thread) while other functions may be performed by either thread. Process 400 is executed by a worker thread of a client application while process 300 is performed by a main thread according to some embodiments. Process 400 may therefore execute contemporaneously with process 300 of FIG. 3 to provide the functionality described herein.

Initially, a request for a story is detected at S410. The request may be directly detected based on user action as described above. In some embodiments, the main thread detects the request based on user action and provides an indication of the request to the worker thread at S410. The indication also provides an identifier of the requested story.

Persisted queries associated with the story are fetched at S420. For example, the worker thread may transmit a request to data server 110 to receive persisted queries of persisted queries 117 which are associated with the story identifier determined at S410. In the above example of process 300, it is assumed that persisted queries 117 do not include persisted queries associated with the story identifier and process 400 fails at S420. In the following description of process 400, it will be assumed that persisted queries 117 include persisted queries associated with the story identifier and therefore flow proceeds to S430 after fetching the associated persisted queries at S420.

The persisted queries are issued to the server at S430. As noted, the persisted queries include all of the queries required to acquire all of the data needed to render each widget of the story. Flow then cycles at S440 until all the corresponding query results have been received. The received query results are posted to the main thread at S450. According to some embodiments, posting the results to the main thread results in storage of the query results in a local cache accessible to the main thread. Each set of query results may be stored in the local cache in association with an identifier (e.g., a hash value) of the query which acquired the set of query results.

Figure 5:
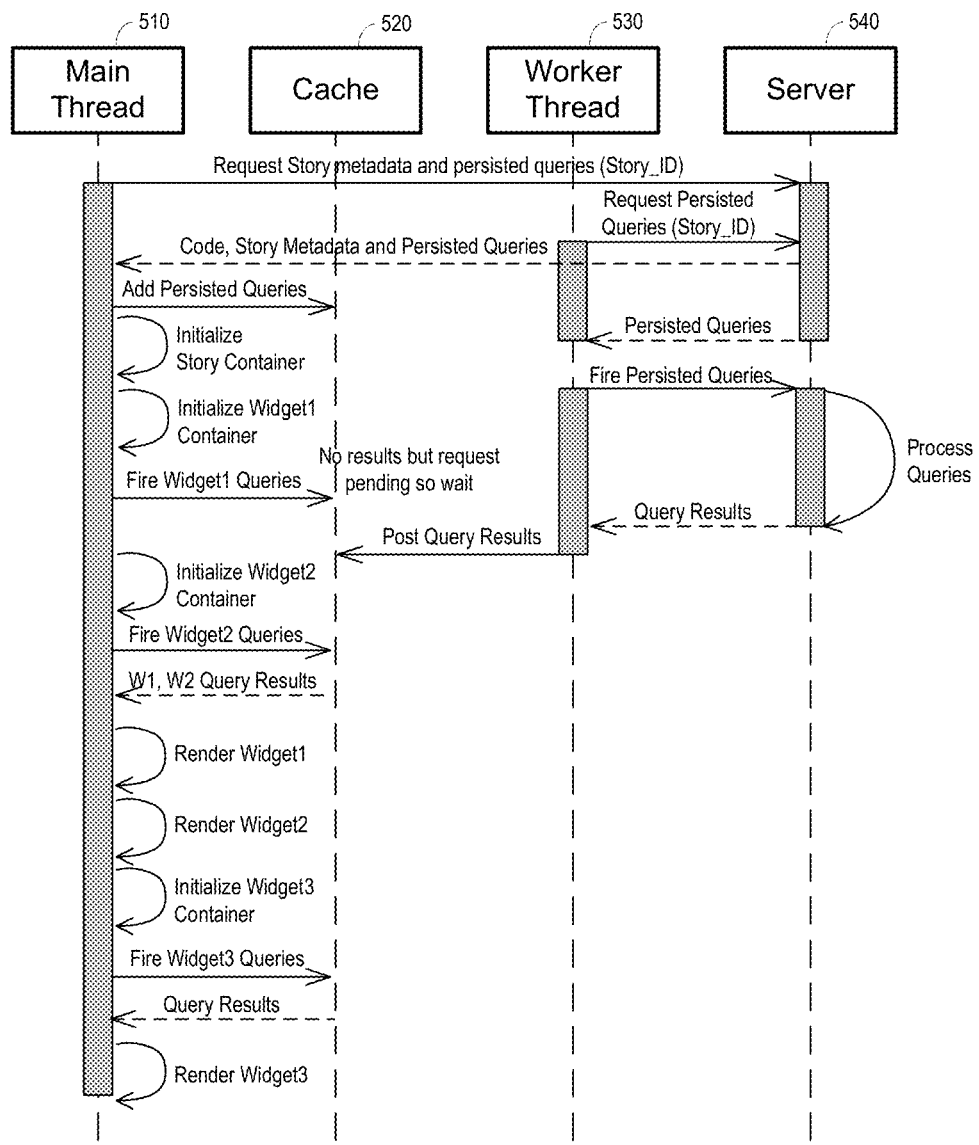
FIG. 5 is a sequence diagram illustrating communication between components to provide data visualizations according to some embodiments.

FIG. 5 is a sequence diagram illustrating coordinated execution of process 300 by a main thread and process 400 by a worker thread according to some embodiments. The FIG. 5 sequence diagram illustrates one possible sequence of events according to some embodiments. It will be evident that other sequences of events are possible, depending upon the number of widgets in a story and the relative amounts of time required for execution of the various depicted events.

As described with respect to process 300, main thread 510 initially transmits a request for a story to server 540. The request also includes a request for persisted queries associated with the story. The request includes an identifier of the story which, in the present example, includes three widgets. The request also triggers worker thread 530 to transmit a request to server 540 for the persisted queries associated with the story. Server 540 returns client application code (e.g., Javascript code), metadata and persisted queries associated with the story to main thread 510 in response to the initial request. Main thread 510 begins executing the client application code to initialize the story container as described above. Client application code may be transmitted to main thread 510, in full or in part, any time prior to its required execution.

In the meantime, worker thread 530 receives persisted queries from server 540. It is therefore assumed that the story has been previously rendered and that the queries associated with its constituent widgets have been persisted on server 540 as described above with respect to process 300. Accordingly, in response to the request for persisted queries received from worker thread 530, server 540 retrieves persisted queries associated with the story identifier accompanying the request and transmits the retrieved persisted queries to worker thread 530.

Worker thread 530 may then fire the persisted queries to server 540. Although FIG. 5 depicts a single firing, queries may be fired sequentially, subject to any limitations on worker thread 530 (e.g., a maximum of six pending queries). While server 540 processes the queries, main thread 510 initializes a first widget container of the story. Initialization includes building of queries associated with the first widget container as described above. The built queries for the first widget are fired on cache 520 in order to determine whether cache 520 stores query results associated with the queries for the first widget. This determination is negative because worker thread 530 has not yet posted any query results at this point of the present example.

It is then assumed that worker thread 530 receives query results from server 540. Worker thread 530 then posts the query results to main thread 510, resulting in storage of the query results in cache 520 as described above.

Main thread 510 proceeds to initialize a second widget and build its associated queries. Main thread 510 then uses the built queries of the second widget to query cache 520 for corresponding query results. Since cache 520 now holds query results for each widget of the story, the query results for the first and second widgets are returned to main thread 510.

Main thread 510 uses the query results to render the first widget and the second widget. Main thread 510 then initializes a container of the third widget of the story and fires its built queries on cache 520. Corresponding query results are returned to main thread 510, which uses the query results to render the third widget.

The sequence of FIG. 5 illustrates system behavior according to a specific example. The order in which the three widgets are initialized, the queries are fired, and the widgets are rendered is not limited to the example.

As mentioned herein, some client applications are limited in the number of queries which may be simultaneously outstanding. If the limit is six, and six queries are currently outstanding, the seventh query cannot be fired until one of the six queries is resolved (e.g., either query results or a failure message are returned). Such a limitation may introduce a processing bottleneck.

Figure 6:
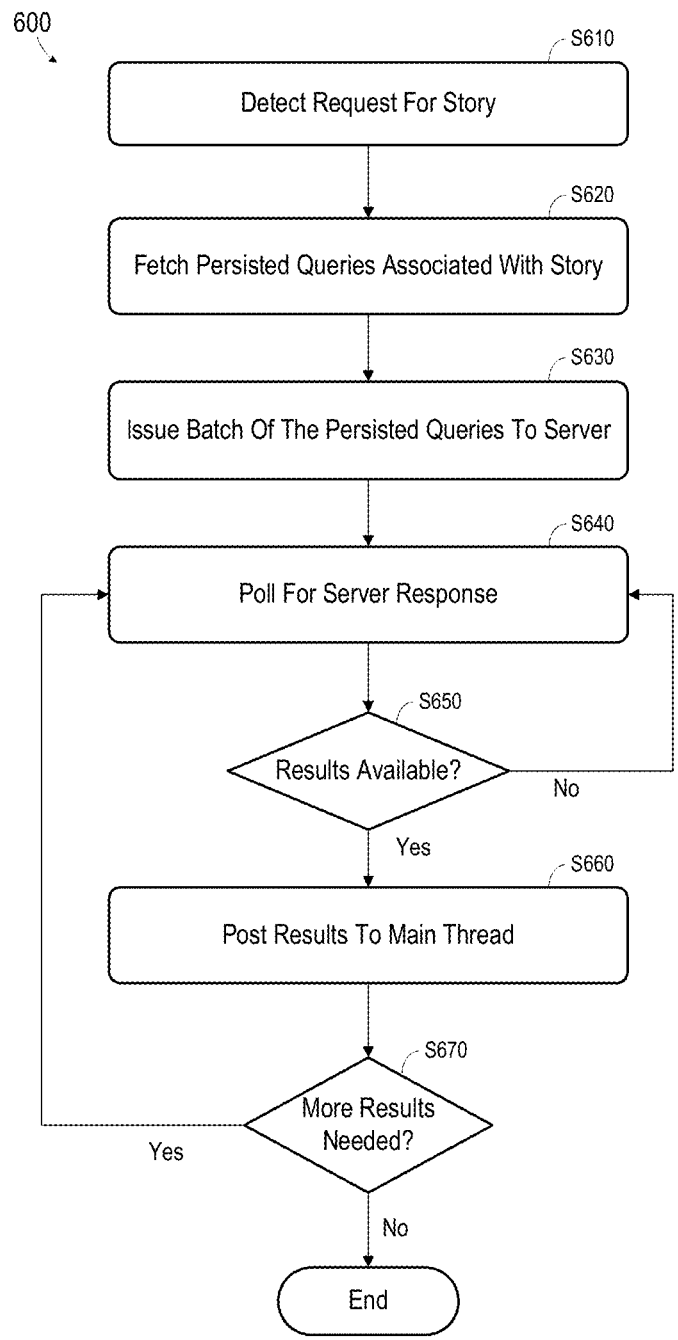
FIG. 6 is a flow diagram of a worker thread process to provide data visualizations according to some embodiments.

FIG. 6 illustrates process 600 which may be executed by a worker thread to address such a processing bottleneck in some embodiments. S610 and S620 are executed to detect a request for a story and fetch persisted queries associated with the story as described above with respect to S310 and S320.

At S630, all of the persisted queries are issued to the server in a single asynchronous request. According to some embodiments of the implementation discussed with respect to FIGS. 4 and 5, a client browser can send up to six requests to the server at a time. The server will process these six requests independently and will return the responses back independently. If six requests are outstanding (i.e., their responses have not yet been returned), any additional desired requests will sit in a pending state on the client browser and will not be sent to the server until a request slot is available.

At S630, the client browser sends to the server any number of queries within one request. The server serves this batch of queries together, processing the queries in parallel based on the number of CPU threads available. The server's initial response to the request returns no results and occurs quickly.

Next, at S640, the server is polled to determine if any query results are available. In response to the polling, the server determines whether query results have been generated for any of the queries of the batch of queries. To perform this determination, the server tracks the completion of each of the queries of the batch. If it is determined at S650 that no query results are available, flow returns to S640. If it is determined at S650 that results are available, the results are posted to the main thread at S660. The posted results may therefore comprise query results for only a subset of the issued batch of queries.

Accordingly, at S670, it is determined whether more query results are needed. For example, the worker thread may maintain a record of each query of the issued batch of queries. If query results associated with a query are posted at S660, the record of the query is modified (e.g., deleted) to indicate that query results for the record have been received. S670 may therefore comprise checking the records to determine whether query results have not yet been received for at least one query of the batch.

Flow returns from S670 to S640 if more query results are needed. Flow then continues as described above until it is determined at S670 that no more query results are needed. The server may also track which query results have been already provided so as not to provide duplicate query results in response to polling at S640.

Figure 7:
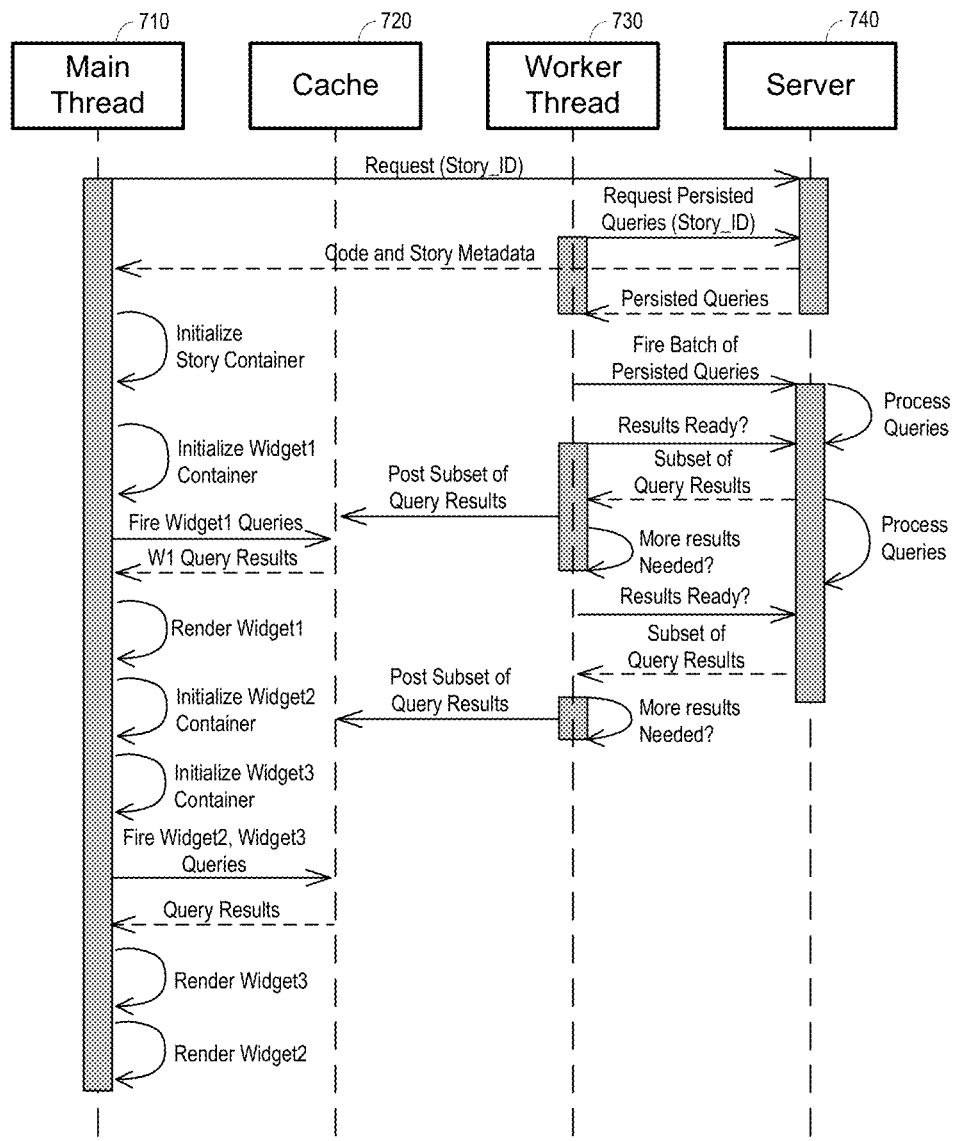
FIG. 7 is a sequence diagram illustrating communication between components to provide data visualizations according to some embodiments.

FIG. 7 is a sequence diagram illustrating coordinated execution of process 300 by a main thread and process 600 by a worker thread according to some embodiments. As described with respect to FIG. 5, the FIG. 7 sequence diagram illustrates one possible sequence of events according to some embodiments.

Main thread 710 transmits a request for a story to server 740 and worker thread 730 transmits a request to server 740 for persisted queries associated with the story. Server 740 returns client application code and metadata to main thread 710, which begins executing the client application code to initialize the story container and the first widget container. It will again be assumed that the story includes three widgets.

Per process 600, worker thread 730 receives persisted queries from server 740 and fires a single asynchronous request including all of the persisted queries to server 740. After waiting a suitable amount of time as described with respect to S640, worker thread 730 asks server 740 for any query results which have been generated up to that point. In the FIG. 7 example, server 740 returns a subset of query results in response, and continues to process the remaining unfulfilled queries. Worker thread 730 posts the subset of query results to main thread 710, resulting in storage of the query results in cache 720 as described above.

Main thread 710 uses the built queries of the first widget to query cache 720 for corresponding query results. It is assumed that the posted subset of query results includes query results associated with the built queries of the first widget, so the query results for the first widget are returned to main thread 710 for rendering the first widget.

Main thread 710 then initializes containers for the second widget and the third widget. Contemporaneously, worker thread 730 determines that more query results are needed and again requests query results from server 740. Server 740 returns a subset of query results and stops processing after determining that all queries in the received batch have been processed. Worker thread 730 posts this subset of query results to main thread 710, resulting in storage of the query results in cache 720. Worker thread 730 also determines that all query results have been received and ceases the requests to server 740.

As shown in FIG. 7, main thread 710 then fires queries associated with the second and third widgets on cache 720 and receives corresponding query results. The query results are used to render the second and third widgets.

Figure 8:
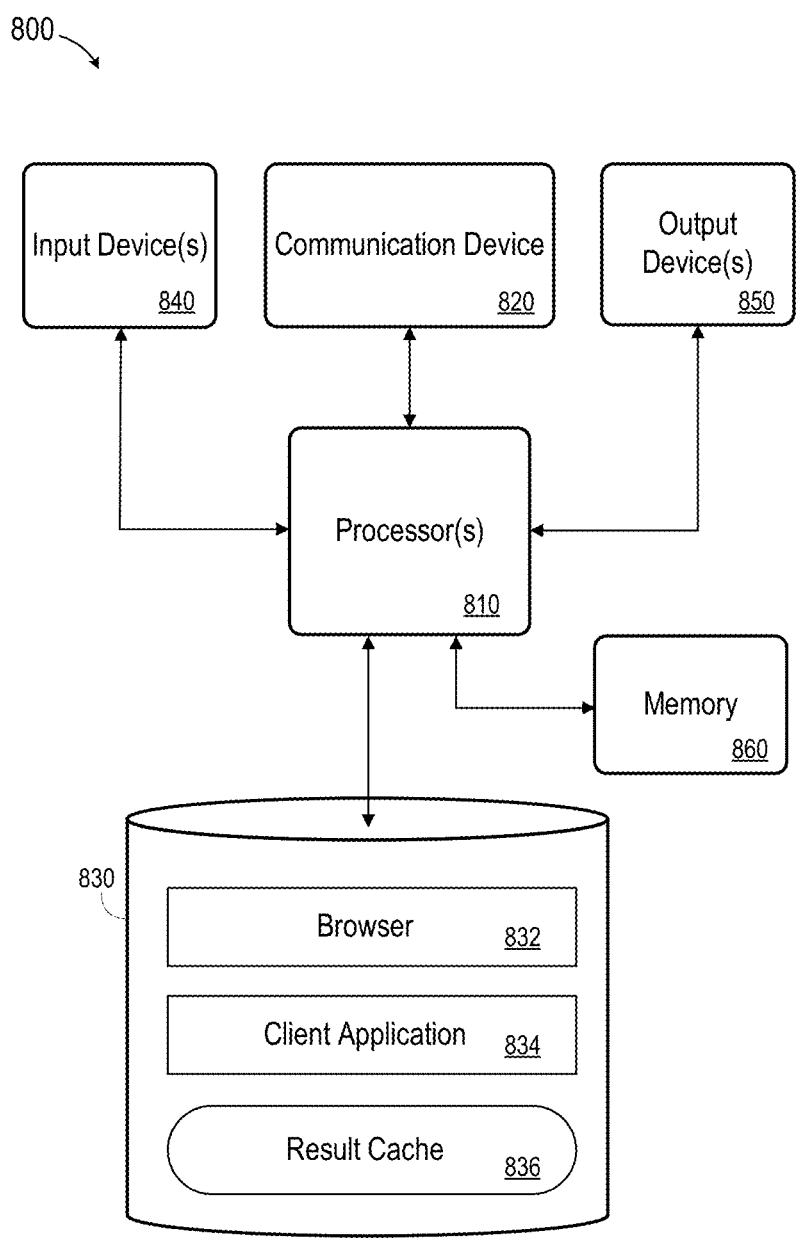
FIG. 8 is a block diagram of an apparatus according to some embodiments.

FIG. 8 is a block diagram of apparatus 800 according to some embodiments.

Apparatus 800 may comprise a general-purpose computing apparatus and may execute program code to perform any of the functions described herein. Apparatus 800 may comprise an implementation of client system 120 as described above. Apparatus 800 may include other unshown elements according to some embodiments.

Apparatus 800 includes processor(s) 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Browser 832 may comprise program code to provide a multi-threaded execution engine, while client application 834 may comprise program code executed by processor 810 (and within the execution engine) to cause apparatus 800 to perform any one or more of the processes described herein. Client application 834 may implement client application 122 described above. Embodiments are not limited to execution of the described processes by a single apparatus.

Result cache 836 may comprise query results received by a worker thread as described above. The query results may be stored in conjunction with key values representing the queries used to generate the query results. The query results may be stored in an intermediate format different from the format in which the query results were received by the worker thread. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk drive, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A device comprising:
   a display;
   a memory system; and
   a processor to execute processor-executable process steps to cause the device to:
      process a user input comprising a link associated with a story, the story comprising a set of data visualizations to display on a web site;
      execute a main thread to:
         request metadata associated with the set of data visualizations, associated with the link, from a remote system,
         receive the metadata from the remote system,
         process the metadata,
         initialize the data visualizations, read definitions for the data visualizations from the metadata, and build a set of queries to populate the data visualizations based, at least partially, on the definitions; and
      execute a worker thread, at least partially in parallel with the execution of the main thread, to determine whether query results for persisted queries for the set of queries associated with the set of visualizations are stored in a cache of the remote system and, responsive to a determination that at least a first portion of the query results for the persisted queries are stored in the remote system, to:
         request a set of the persisted queries associated with the set of data visualizations from the remote system,
         issue the set of the persisted queries to the remote system, to receive query results associated with the set of the persisted queries from the remote system, and
         initiate storage of the query results in the memory system,
      wherein the main thread is further executed to retrieve the query results stored in the memory system and render the set of data visualizations on the display based on the retrieved query results.

2. The device according to claim 1, wherein retrieval of the query results stored in the memory system comprises building of queries associated with the set of data visualizations based on the metadata, and retrieval of the query results stored in the memory system based on the built queries.

3. The device according to claim 2, wherein retrieval of the query results stored in the memory system comprises generation of a hash of each of the built queries and querying of the memory system based on the hashes.

4. The device according to claim 2, wherein the main thread is further to initialize one or more user interface containers associated with the set of data visualizations, at least partially in parallel with the issuance of the set of the persisted queries and reception of the query results by the worker thread.

5. The device according to claim 1, wherein issuance of the set of the persisted queries, reception of the query results, and initiation of the storage comprises:
   transmission of a request to the remote system including the set of the persisted queries;
   reception of a first subset of the query results from the remote system;
   posting of a first message to the main thread including the first subset of the query results;
   reception of a second subset of the query results from the remote system; and
   posting of a second message to the main thread including the second subset of the query results.

6. The device according to claim 1, wherein reception of the query results comprises:
   periodically requesting a subset of query results from the remote system until the query results associated with the set of the persisted queries have been received.

7. The device according to claim 1, wherein the main thread is to instruct the remote system to store the set of the persisted queries.

8. A method comprising:
   receiving a user input comprising a request for a set of data visualizations, the user input comprising a link associated with a story, the story comprising a set of data visualizations to display on a web site;
   in response to the user request, executing a main thread to:
      request metadata associated with the set of data visualizations from a remote system,
      receive the metadata from the remote system,
      process the metadata,
      initialize the data visualizations, read definitions for the data visualizations from the metadata, and build a set of queries to populate the data visualizations based, at least partially, on the definitions;
   executing a worker thread, at least partially in parallel with the execution of the main thread, to determine whether query results for persisted queries for the set of queries associated with the set of visualizations are stored in a cache of the remote system and, responsive to a determination that at least a first portion of the query results for the persisted queries are stored in the remote system, to:
      request a set of the persisted queries associated with the set of data visualizations from the remote system, to issue the set of the persisted queries to the remote system,
      receive query results associated with the set of the persisted queries from the remote system, and
      initiate storage of the query results in a local memory; and
   executing the main thread to retrieve the query results stored in the local memory and render the set of data visualizations based on the retrieved query results.

9. The method according to claim 8, wherein retrieval of the query results stored in the local memory comprises building of queries associated with the set of data visualizations based on the metadata, and retrieval of the query results stored in the local memory based on the built queries.

10. The method according to claim 9, wherein retrieval of the query results stored in the local memory comprises generation of a hash of each of the built queries and querying of the local memory based on the hashes.

11. The method according to claim 9, wherein the main thread is further to initialize one or more user interface containers associated with the set of data visualizations, at least partially in parallel with the issuance of the set of the persisted queries and reception of the query results by the worker thread.

12. The method according to claim 8, wherein issuance of the set of the persisted queries, reception of the query results, and initiation of the storage comprises:
   transmission of a request to the remote system including the set of the persisted queries;
   reception of a first subset of the query results from the remote system;
   posting of a first message to the main thread including the first subset of the query results;
   reception of a second subset of the query results from the remote system; and
   posting of a second message to the main thread including the second subset of the query results.

13. The method according to claim 8, wherein reception of the query results comprises:
   periodically requesting a subset of query results from the remote system until the query results associated with the set of the persisted queries have been received.

14. The method according to claim 8, wherein the main thread is to instruct the remote system to store the set of the persisted queries.

15. A system comprising:
   a storage system to store data, metadata associated with a plurality of sets of data visualizations, and a plurality of sets of persisted queries;
   a server system to:
      process a request received from a main thread of a client application, responsive to receiving a user input comprising a link associated with a story, the story comprising-a first set of data visualizations of the plurality of sets of data visualizations to display on a web site, the request being for metadata associated with the first set of data visualizations from a remote system, the metadata including definitions for the data visualizations, a set of queries being built to populate the data visualizations based, at least partially, on the definitions;
      receive, from a worker thread of the client application, a request for a determination of whether query results for the first set of the plurality of sets of persisted queries associated with the set of visualizations are stored in a cache of the remote system and, responsive to a determination that at least a first portion of the query results for the first set of the persisted queries are stored in the remote system, transmit the first set of the persisted queries to the worker thread of the client application;
      receive, from the worker thread of the client application, a request for query results associated with the first set of the persisted queries;
      generate query results associated with the first set of the persisted queries; and
      transmit the query results to the worker thread.

16. The system according to claim 15, wherein generation and transmission of the query results comprises:
   reception of a first request from the worker thread for a subset of the query results;
   determination of whether a first subset of the query results has been generated;
   if it is determined that the first subset of the query results has been generated, transmit the first subset of the query results to the worker thread;
   reception of a second request from the worker thread for a subset of the query results;
   determination of whether a second subset of the query results has been generated; and
   if it is determined that the second subset of the query results has been generated, transmit the second subset of the query results to the worker thread.

17. The system according to claim 15, further comprising receiving a request from the main thread to store the first set of the persisted queries in association with the first set of data visualizations.

* * * * *